United States Patent
Frank (10) Patent No.: US 11,285,477 B2
(45) Date of Patent: Mar. 29, 2022

(54) METHOD AND APPARATUS FOR MEASURING A TEMPERATURE OF A FLUID FOR USE WITH A MICROFLUIDIC ANALYSIS APPARATUS, AND MICROFLUIDIC ANALYSIS APPARATUS COMPRISING AN APPARATUS

(71) Applicant: Robert Bosch GmbH, Stuttgart (DE)

(72) Inventor: Tino Frank, Lucerne (CH)

(73) Assignee: Robert Bosch GmbH, Stuttgart (DE)

( * ) Notice: Subject to any disclaimer, the term of this patent is extended or adjusted under 35 U.S.C. 154(b) by 189 days.

(21) Appl. No.: 16/555,749

(22) Filed: Aug. 29, 2019

(65) Prior Publication Data
US 2021/0060554 A1 Mar. 4, 2021

(51) Int. Cl.
*B01L 3/00* (2006.01)
*G01N 25/04* (2006.01)
*B01L 7/00* (2006.01)

(52) U.S. Cl.
CPC ..... *B01L 3/502715* (2013.01); *B01L 3/50273* (2013.01); *B01L 7/525* (2013.01); *G01N 25/04* (2013.01); *B01L 2200/10* (2013.01); *B01L 2300/18* (2013.01)

(58) Field of Classification Search
CPC ............... B01L 3/502715; B01L 7/525; B01L 3/50273; B01L 2200/10; B01L 2300/18; B01L 3/5027; G01N 25/04; G01K 11/00
See application file for complete search history.

(56) References Cited

U.S. PATENT DOCUMENTS

| | | | |
|---|---|---|---|
| 2003/0048831 A1 | 3/2003 | Lemoine et al. | |
| 2010/0044586 A1* | 2/2010 | Duhr | G01N 21/6428 250/459.1 |
| 2013/0035573 A1* | 2/2013 | Fujiwara | A61B 5/150412 600/345 |

FOREIGN PATENT DOCUMENTS

| | | |
|---|---|---|
| DE | 10 2007 060 156 B3 | 1/2009 |
| DE | 10 2008 019 756 A1 | 11/2009 |

OTHER PUBLICATIONS

Musheev, Michael U., et al. "Diffusion as a Tool of Measuring Temperature inside a Capillary." Analytical chemistry 80.17 (2008): 6752-6757. (Year: 2008).*
Girod, M. et al., "Monitoring the migration behavior of living microorganisms in capillary electrophoresis using laser-induced fluorescence detection with a charge-coupled device imaging system," Electrophoresis, 2002, vol. 23, pp. 2048-2056 (9 pages).
Huang, T. et al., "Axially illuminated fluorescence imaging detection for capillary isoelectric focusing on Teflon capillary," The Analyst Communication, 2000, vol. 125, 1231-1233 (3 pages).

* cited by examiner

*Primary Examiner* — Jennifer Wecker
*Assistant Examiner* — Oyeleye Alexander Alabi
(74) *Attorney, Agent, or Firm* — Maginot, Moore & Beck LLP (57) ABSTRACT

A method for measuring a temperature of a fluid for use with a microfluidic analysis apparatus includes a reading step and a determination step. During the reading step, at least one diffusion signal is read, the latter representing a diffusion characteristic of the diffusion of the fluid. During the determination step, the temperature is determined using the at least one diffusion signal.

12 Claims, 8 Drawing Sheets

METHOD AND APPARATUS FOR MEASURING A TEMPERATURE OF A FLUID FOR USE WITH A MICROFLUIDIC ANALYSIS APPARATUS, AND MICROFLUIDIC ANALYSIS APPARATUS COMPRISING AN APPARATUS

BACKGROUND

The approach proceeds from an apparatus or a method according to the preamble of the independent claims. The subject matter of the present approach also includes a computer program.

Microfluidic systems allow a very sensitive analysis of small amounts of a sample. Automation, miniaturization and parallelization moreover allow a reduction of manual steps and a reduction of errors caused thereby.

SUMMARY

Against this backdrop, the approach presented here presents a method for measuring a temperature of a fluid for use with a microfluidic analysis apparatus, furthermore an apparatus that makes use of this method and a corresponding computer program and, finally, a microfluidic analysis apparatus comprising an apparatus in accordance with the main claims. The measures listed in the dependent claims render possible advantageous developments and improvements of the apparatus specified in the independent claim.

The advantages achievable with the approach presented here consist of a method presented here advantageously facilitating a calibration-free in situ measurement of a temperature of a fluid. This allows a dynamic adaptation or alteration of a temperature-control device for exactly setting a desired temperature of the fluid.

A method for measuring the temperature of a fluid for use with a microfluidic analysis apparatus is presented. The method comprises a reading step and a determination step. During the reading step, at least one diffusion signal is read, the latter representing a diffusion characteristic of the diffusion of the fluid. During the determination step, the temperature is determined using the at least one diffusion signal.

The diffusion characteristic can be identified using a fluid-specific diffusion constant, which represents space-time kinetics of said fluid in $m/s^2$. Here, the fluid-specific diffusion constant may be known; however, it is temperature-dependent, meaning that the fluid diffuses more quickly as its temperature increases. Accordingly, the temperature can be determined by analyzing a diffusion of the fluid.

During the determination step, the temperature can be determined by solving a diffusion equation, i.e., a partial differential equation.

By way of example, this method can be implemented using software or hardware, or using a mixed form made of software and hardware, for example in a controller or an apparatus.

The method may include an identification step prior to the reading step, wherein, during the identification step, the diffusion characteristic of the fluid is identified using at least one auxiliary means, more particularly a fluorescence means, introduced into the fluid and/or using at least one camera image. Here, the fluorescence means can be introduced, or may have been introduced, into the fluid with a predefined concentration. Consequently, the diffusion characteristic is identifiable as a fluorescence signal which can indicate a concentration of the auxiliary means in the fluid.

It is furthermore advantageous in accordance with one embodiment if, during the reading step, at least one further diffusion signal is read, wherein the diffusion signal represents a concentration of the auxiliary means and the further diffusion signal represents a further concentration of the auxiliary means in the fluid, wherein, during the determination step, the temperature can be determined depending on the concentration of the auxiliary means corresponding to the diffusion signal and the further diffusion signal and/or depending on a time interval between recording the diffusion signal and the further diffusion signal.

However, during the reading step, a linear concentration gradient between a first chamber with a first concentration of the auxiliary means and/or a first temperature of the fluid and a second chamber with a second concentration of the auxiliary means and/or a second temperature of the fluid may alternatively also be read as the diffusion signal. The temperature, or else both temperatures if the first and the second temperature differ, can then be determined using the linear concentration gradient. Moreover, this advantageously allows different temperatures of the fluid to be determined in the first and the second chamber.

The method may include a step of altering a concentration of the auxiliary means prior to the reading step. The alteration step may also be performed prior to the identification step. Here, part of the fluid with the predetermined concentration of the auxiliary means may be replaced by a further part of the fluid without the auxiliary means, for example. Diffusion can now be observed. Consequently, the above-described diffusion signal and the further diffusion signal can be provided.

During the identification step, the diffusion characteristic of the fluid may however also be identified using a bleaching of the auxiliary means and/or an illumination device. Here, the auxiliary means may have been added to the entire fluid in advance, and then some of the auxiliary means may be bleached at one point, for example by means of light. It is now possible to measure the time until a fluorescence signal at this point is saturated again as a result of diffusion.

It is furthermore advantageous if the method includes an adaptation or alteration step in which an adaptation signal (which may alternatively, or synonymously, also be referred to as alteration signal) for setting a temperature-control device is output using the temperature, more particularly if the temperature has a predetermined relationship with an intended temperature. Here, the adaptation or alteration signal can bring about a heating or cooling of the fluid or of a fluid container in which the fluid is disposed. By way of example, heating can be brought about if the temperature drops below the intended temperature in order to bring about an attainment of the intended temperature. Else, cooling can be brought about if the temperature exceeds the intended temperature in order to bring about an attainment of the intended temperature. Here, the adaptation signal or alteration signal advantageously allows a closed-loop temperature control of the fluid.

Moreover, the method may include a checking step, in which a test signal is read, said test signal indicating that a fluid container of the fluid is received on or at the analysis apparatus, more particularly wherein a warning signal can be output if the test signal indicating an incorrect reception of the fluid container on or at the analysis apparatus is read. The checking step can be carried out in response to the determination step, for example if the temperature has a predetermined relationship with an intended temperature. By way of example, if the temperature deviates very strongly from the intended temperature, i.e., in a manner exceeding or dropping below a defined tolerance range, the assumption can be made that the fluid container does not rest correctly on the heating device or does not rest correctly against the heating device. By way of example, the warning signal can be embodied to indicate an error message to a user of the analysis apparatus and/or terminate an analysis process.

The approach presented here further develops an apparatus embodied to carry out, actuate or implement the steps of a variant of a method presented here in appropriate devices. Additionally, this embodiment variant of the approach in the form of an apparatus can quickly and efficiently solve the problem underlying the approach.

To this end, the apparatus may comprise at least one calculation unit for processing signals or data, at least one memory unit for storing signals or data, at least one interface to a sensor or an actuator for reading sensor signals from the sensor or for outputting data or control signals to the actuator and/or at least one communications interface for reading or outputting data, which are embedded in a communications protocol. By way of example, the calculation unit may be a signal processor, a microcontroller or the like, wherein the memory unit can be a flash memory, an EPROM or a magnetic memory unit. The communications interface can be embodied to read or output data in wireless and/or wire-transmitted fashion, wherein a communications interface that can read or output wire-transmitted data can read these data electrically or optically, for example, from an appropriate data transfer line or can output said data into a corresponding data transfer line.

In the present case, an apparatus can be understood to mean an electrical appliance that processes sensor signals and outputs control and/or data signals in a manner dependent thereon. The apparatus may have an interface, which may have an embodiment in terms of hardware and/or software. In the case of an embodiment in terms of hardware, the interfaces may be part of a so-called system ASIC, for example, which contains many various functions of the apparatus. However, it is also possible for the interfaces to be dedicated integrated circuits or to at least partly consist of discrete components. In the case of an embodiment in terms of software, the interfaces can be software modules which, for example, are present on a microcontroller in addition to other software modules.

In an advantageous configuration, the apparatus implements a determination of a temperature. To this end, the apparatus can access, e.g., sensor signals such as at least one diffusion signal. The actuation is implemented by way of actuators such as a reading device for reading the diffusion signal and a determination device for determining the temperature using the diffusion signal.

A microfluidic analysis apparatus, more particularly an optofluidic analysis apparatus comprising at least one camera device and/or illumination device, comprises the presented apparatus. Such a microfluidic analysis apparatus can serve as a replacement for known microfluidic analysis apparatuses, wherein the microfluidic analysis apparatus presented here can advantageously determine a temperature of a fluid in quick and simple fashion without a calibration. Advantageously, no additional components for the analysis apparatus and no manual steps by an operator of the microfluidic analysis apparatuses are required to this end.

A computer program product or computer program comprising program code that may be stored on a machine-readable medium or storage medium such as a semiconductor memory, a hard disk drive or an optical memory and that is used to carry out, implement and/or actuate the steps of the method according to any one of the embodiments described above is also advantageous, particularly if the program product or program is executed on a computer or an apparatus.

BRIEF DESCRIPTION OF THE DRAWINGS

Exemplary embodiments of the approach presented here are illustrated in the drawings and explained in more detail in the subsequent description. In detail.

DETAILED DESCRIPTION

In the following description of expedient exemplary embodiments of the present approach, the same or similar reference signs are used for the elements that are illustrated in the various figures and that have a similar effect, with a repeated description of these elements being dispensed with.

If an exemplary embodiment comprises an "and/or" link between a first feature and a second feature, this should be read to mean that the exemplary embodiment comprises both the first feature and the second feature according to one embodiment and comprises either only the first feature or only the second feature according to a further embodiment.

Figure 1:
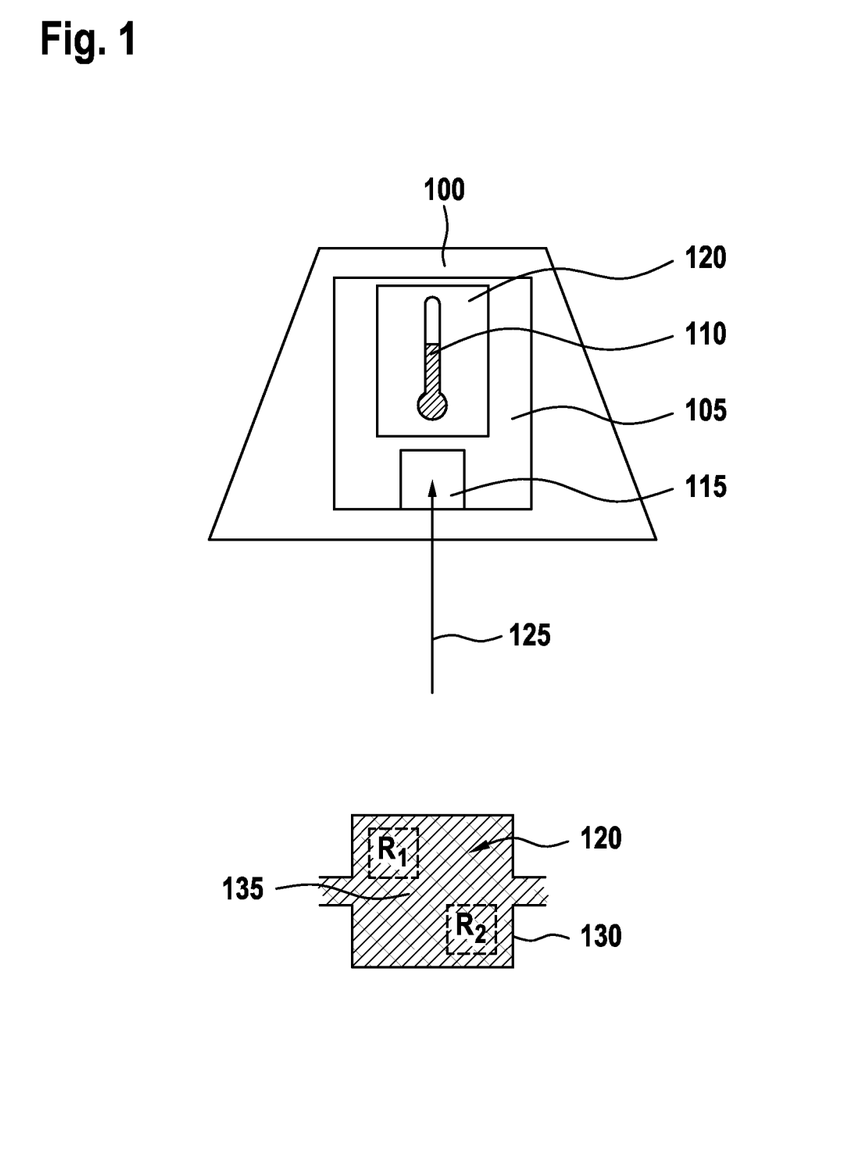
FIG. 1 shows a schematic illustration of a microfluidic analysis apparatus comprising an apparatus for measuring a temperature of a fluid according to one exemplary embodiment.

FIG. 1 shows a schematic illustration of a microfluidic analysis apparatus 100 comprising an apparatus 105 for measuring a temperature 110 of a fluid 120 according to one exemplary embodiment.

According to this exemplary embodiment, the apparatus 105 is received at or in the microfluidic analysis apparatus 100. According to this exemplary embodiment, the microfluidic analysis apparatus 100 is an optofluidic analysis apparatus 100, which comprises at least one camera device.

The apparatus 105 is embodied to measure the temperature 110 of the fluid 120. To this end, the apparatus 105 comprises a reading device 115 and a determination device 120. The reading device 115 is embodied to read at least one diffusion signal 125, which represents a diffusion characteristic of a diffusion of the fluid 120. According to one exemplary embodiment, the reading device 115 reads the diffusion signal 125 from the camera device. The determination device 120 is embodied to determine the temperature 110 using the at least one diffusion signal 125.

According to this exemplary embodiment, the fluid 120 is received together with an auxiliary means 135 in a diffusion chamber 130 of a fluid container. According to this exemplary embodiment, the auxiliary means 135 is a fluorescence means, which is disposed in a state where it has already diffused into the fluid 120 in accordance with this exemplary embodiment.

According to this exemplary embodiment, the apparatus 105 has identified the diffusion characteristic of the fluid 120 using the auxiliary means 135 and/or at least one camera image of the camera device.

Figure 2:
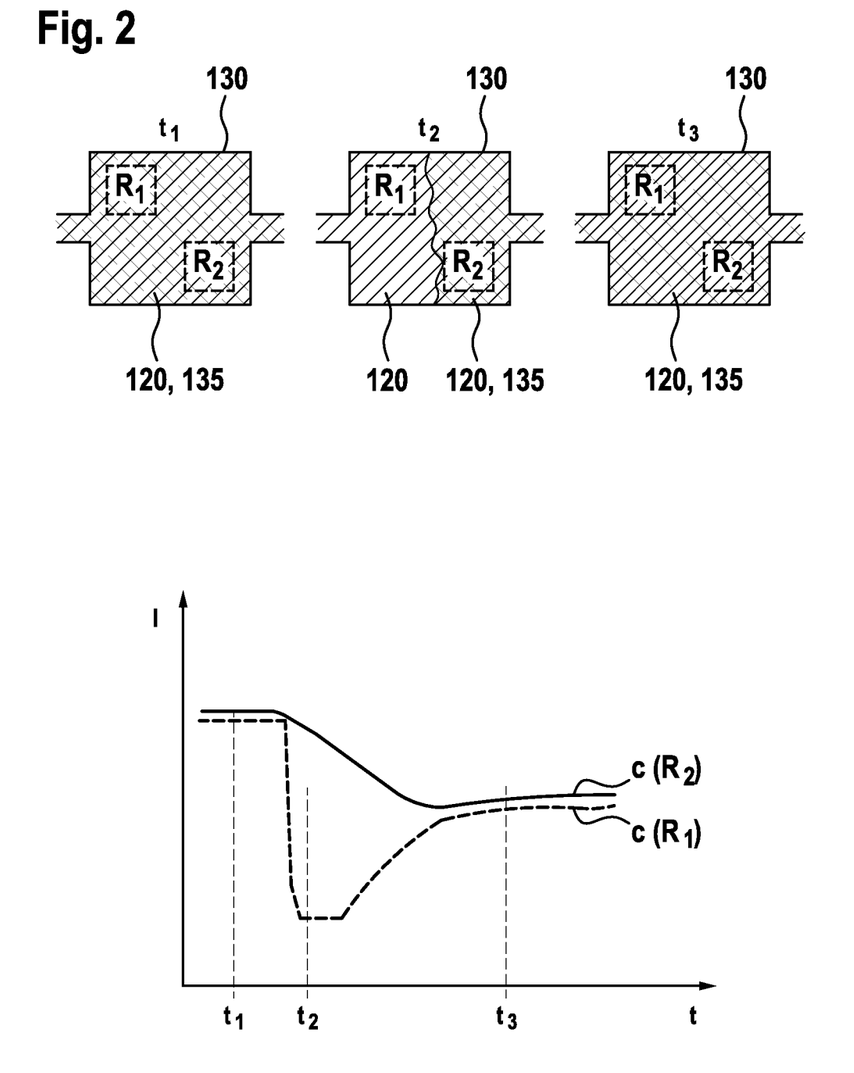
FIG. 2 shows a schematic illustration of a diffusion of an auxiliary means into a fluid according to one exemplary embodiment.

Bringing about the diffusion of the auxiliary means 135 into the fluid 120, which is actuatable by the apparatus 105, is described in FIG. 2.

Details of the apparatus 105 are described, once again, in more detail below:

The microfluidic analysis apparatus 100 shown here may also be referred to as a microfluidic system, which facilitates a very sensitive analysis of small amounts of a sample. Automation, miniaturization and parallelization moreover allow a reduction of manual steps and a reduction of errors caused thereby.

Microfluidic systems, which carry out fluidic processes and make analytical deductions using an optical system, are assigned to optofluidics. Here, the optofluidic approaches use properties of light for generating results. A common embodiment relates to the measurement of fluorescence. Fluorescence allows the visualization of specific molecules such as proteins, for example by antibody dyeing. By way of example, fusion proteins can be visualized by integrating green fluorescent protein, abbreviated GFP, into a protein via protein engineering. However, fluorescence also allows the visualization of nucleic acids, for example by means of quantitative real-time polymerase chain reaction, abbreviated qPCR, and/or fusion curves. However, the detection of chemical bonds is also possible, for example by means of the Förster resonance energy transfer, abbreviated FRET technology. These technologies are not only of qualitative nature but can also be quantified. Deductions about amounts present and the temporal creation or breakdown thereof are possible.

As a rule, quantitative fluorescence measurements are facilitated by way of a calibration curve. A known variable, for example concentration and/or temperature, is assigned to a fluorescence signal in this case. There usually is a linear relationship within a defined interval. Thus, the concentration of a fluorescence-marked protein can be detected by way of a fluorescence strength.

If the intention is to establish a temperature by way of a fluorescence signal, a calibration curve, temperature versus intensity, should be created. Here, the temperature of the fluid should be known. However, measuring the fluid temperature in a microfluidic cartridge is nontrivial. The installation of thermal elements can often interfere with the functionality of the microfluidic unit and can falsify measurements. Moreover, the complexity of the system is increased. A process that can measure the temperature 110 of fluids 120 in an optofluidic system using optofluidic processes is facilitated by the apparatus 105 presented here. Here, the optics system already available, in the form of the camera device in this case, can be used and it should advantageously require no outlay to establish a temperature measuring system and integrate the latter into the overall system of the microfluidic analysis apparatus 100.

An advantage here is that optical systems allow not only a measurement of fluorescence intensities but also a spatial resolution. Consequently, the movements of particles can be visualized and measured. Molecular movements are strongly dependent on temperature. Accordingly, conclusions about the temperature can be made by way of a measurement of movement, which is possible via diffusion in the case of a molecular movement. Advantageously, diffusion is independent of intensity and should not be calibrated.

Accordingly, the apparatus 105 presented here facilitates an optofluidic measurement of the fluid temperature 110 in a microfluidic chamber by way of diffusion. According to this exemplary embodiment, the measurement is implemented by way of fluorescence and, according to this exemplary embodiment, requires no further sensor elements than the auxiliary means 135 in the form of fluorophores and the camera device.

Expressed differently, the apparatus 105 facilitates a diffusion-based, optofluidic temperature measurement for calibrating and controlling a chamber temperature in a microfluidic system.

FIG. 2 shows a schematic illustration of a diffusion of an auxiliary means 135 into a fluid 120 according to one exemplary embodiment. Bringing about the diffusion at three successive times $t_1$, $t_2$, $t_3$ is illustrated, with the time $t_3$ representing the diffused state of the auxiliary means 135 in the fluid 120 in the diffusion chamber 130, as shown in FIG. 1. Bringing about the diffusion can be effected by the apparatus described in FIG. 1.

The illustration shows a general embodiment of a method as is actuatable by the apparatus described in FIG. 1 by way of actuating a pneumatic unit of the microfluidic analysis apparatus. The microfluidic diffusion chamber 130, which can be subdivided into symmetric portions according to this exemplary embodiment, is filled at a first time $t_1$ with a fluorescing solution in the form of the fluid 120 with the auxiliary means 135 with a predefined concentration. The filling process is actuatable by the apparatus. Here, a fluid-specific diffusion constant is known. The latter may have been ascertained using any appropriate system. Symmetric portions is understood to mean that two different recording areas or optical measurement areas $R_1$, $R_2$, regions of interest, abbreviated ROI, can be recorded by a camera device or an optical unit, said regions of interest having the same volumes and/or geometries so that these are rendered comparable.

A certain partial volume of the diffusion chamber 130, ideally half according to this exemplary embodiment, has then been replaced by a solution buffer in the form of the fluid 120 without the fluorescing marker by way of a laminar flow at a second time $t_2$. This is facilitated by virtue of the diffusion chamber 130 having two inputs. Here, the buffer is filled from one side while the fluorescence solution to be displaced is drained via the second input. The laminar flow is mandatory so that as little active mixing as possible arises during the fluid replacement. According to this exemplary embodiment, the laminar flow is achieved using a peristaltic pump and/or a precise pressure equalization system, actuated by the apparatus. According to this exemplary embodiment, the volumetric replacement is tracked and recorded using the camera device described in FIG. 1.

Once the volume has been replaced, the system is left to rest and the mixture of the buffer with the fluorescence solution is recorded by way of a fluorescence measurement in the two ROIs R1, R2. Here, an asymptotic signal curve arises. The temperature-specific diffusion constants, which are system independent, can be calculated from the curves c(R1), c(R2). To this end, the determination device solves a diffusion equation, i.e., a partial differential equation.

If the one ROI is situated in the region of the buffer, $R_1$ according to this exemplary embodiment, and if the other ROI is situated in symmetric fashion in the region of the solution, $R_2$ according to this exemplary embodiment, the curve of $R_1$ only detects background signal of the buffer after the replacement of the volume; as a result of the mixture by diffusion, however, the signal increases again and converges with the curve of $R_2$, which starts with a high signal.

According to this exemplary embodiment, the apparatus described in FIG. 1 is embodied to read at least one further diffusion signal, wherein the diffusion signal represents the concentration I of the auxiliary means 135 and the further diffusion signal represents a further concentration I of the auxiliary means 135 in the fluid 120, wherein the determination device is embodied to determine the temperature depending on a concentration I of the auxiliary means 135 in accordance with the diffusion signal and further diffusion signal and/or a time interval between a recording of the diffusion signal and of the further diffusion signal.

Any detectable solution can be used as the auxiliary means 135 for the fluorescence measurement. A dextran standard marked with fluorescence is used as the auxiliary means 135 for qualitative results according to one exemplary embodiment. Said standard can be presented with a defined concentration. Dextrans, i.e., long sugar chains, are available with defined lengths and hence defined masses. According to one exemplary embodiment, a solution with a defined molecular mass in the interval of 5-50 kDa is ideally used as the auxiliary means 135. The diffusion constants of such solutions can be easily ascertained. According to one exemplary embodiment, dextrans are also presented as lyophilizates or integrated in other lyophilizates.

Figure 3:
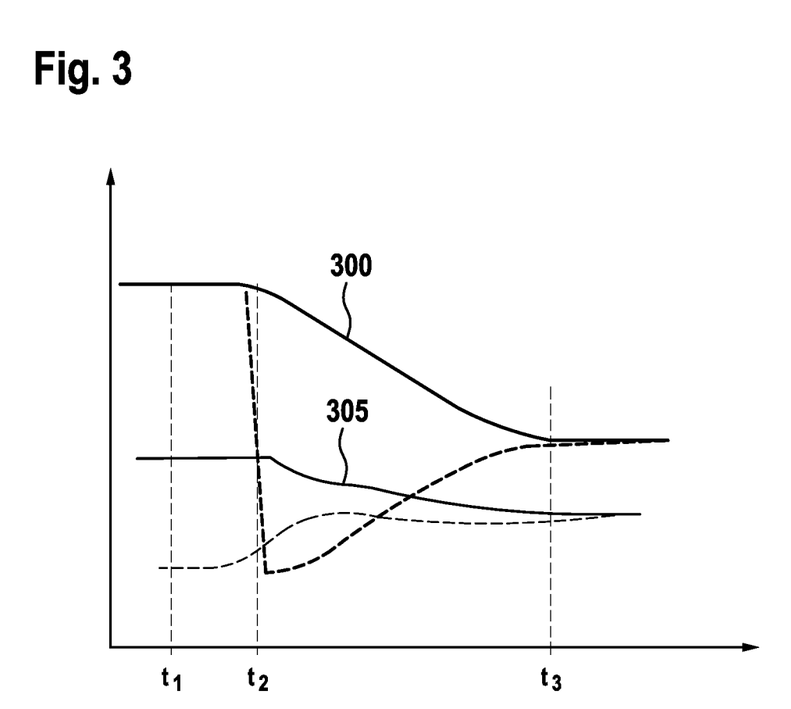
FIG. 3 shows a schematic illustration of a diffusion of an auxiliary means into a fluid according to one exemplary embodiment.

FIG. 3 shows a schematic illustration of a diffusion of an auxiliary means 135 into a fluid 120 according to one exemplary embodiment.

Here, this may relate to a diffusion as described in FIG. 2, with the difference that use has been made of two dyes. Instead of a buffer, half of the volume was replaced by a second fluorescing dye according to this exemplary embodiment. Using this, it is possible to record two curves 300, 305 and an accuracy of the measurement can be estimated particularly well.

Figure 4:
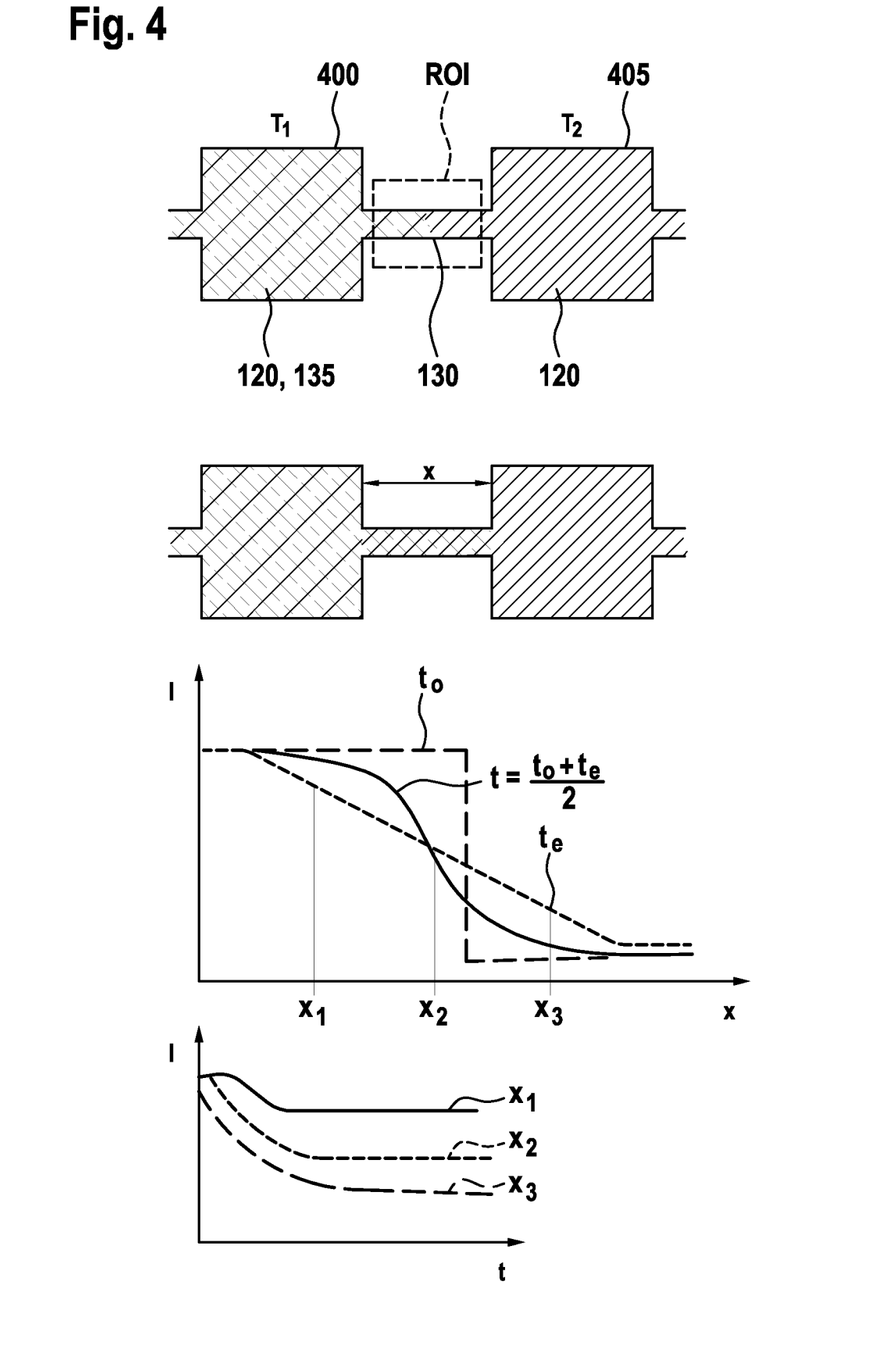
FIG. 4 shows a schematic illustration of a diffusion of an auxiliary means into a fluid according to one exemplary embodiment.

FIG. 4 shows a schematic illustration of a diffusion of an auxiliary means 135 into a fluid 120 according to one exemplary embodiment. Here, this may relate to the fluid 120 and auxiliary means 135 described in any one of the preceding figures; however, these are disposed in a fluid container with, additionally, a first chamber 400 and a second chamber 405. According to this exemplary embodiment, the diffusion chamber 130 is arranged between the first chamber 400 and the second chamber 405. Bringing about the diffusion can be effected, as described in FIG. 2, by the apparatus described in the preceding figures.

FIG. 4 shows an embodiment of how the temperature can be measured in two chambers 400, 405 with different heater temperatures $T_1$, $T_2$. Here, the chambers 400, 405 each have a dedicated heating element. Additionally, the chambers 400, 405 are connected by the diffusion chamber 130 in the form of a channel, the volume of which is many times smaller than that of the two chambers 400, 405. Ideally, this channel according to this exemplary embodiment is separated by a valve. As described in FIG. 2, one of the two chambers 400 is filled by the auxiliary means 135 in the form of a dye and the second chamber 405 is analogously filled only with the buffer in which the dye was dissolved, i.e., only with the fluid 120. Now, the liquids are allowed to communicate and the way in which the buffer and dye mix in the connecting channel, i.e., the diffusion chamber 130, is measured by means of fluorescence. Since the connecting channel is significantly smaller than the chambers 400, 405, the chambers 400, 405 represent a reservoir with constant temperature $T_1$, $T_2$ and concentration I. Consequently, no homogeneous mixture as in FIGS. 1 to 3 arises in the diffusion chamber 130; instead, a linear concentration gradient $t_e$ arises in accordance with Fick's second law. A slope of the gradient depends on the dye concentration in the respective chambers 400, 405. The kinetics of building up the gradient depend on the diffusion speed, described by the diffusion constant, and depend on the temperatures $T_1$, $T_2$ of the reservoir chambers 400, 405. Since all parameters, i.e., geometries, concentrations and time, are known apart from the temperature and these are read by the apparatus described in the preceding figures, the temperature can again be deduced by ascertaining the diffusion constant. Here, the determination device according to this exemplary embodiment fits a heat equation, heat and substance transport between two sources, and said heat equation is solved for the diffusion constant.

According to this exemplary embodiment, the ROI is the connecting channel. Here, as shown in the central graph, the concentration I is plotted in the x-direction. The line $t_e$ shows the equilibrium state, the linear gradient, after said equilibrium state has been reached. The dashed lines show the development of the concentration which is recorded. A lowermost graph in FIG. 4 shows the temporal concentration developments at certain points x in the diffusion chamber 130.

According to one exemplary embodiment, the apparatus presented in one of the preceding figures is embodied to read, as the diffusion signal, the linear concentration gradient $t_e$ between the first chamber 400 with a first concentration I of the auxiliary means 135 and/or temperature $T_1$ of the fluid 120 and the second chamber 405 with a second concentration I of the auxiliary means and/or second temperature $T_2$ of the fluid 120.

Figure 5:
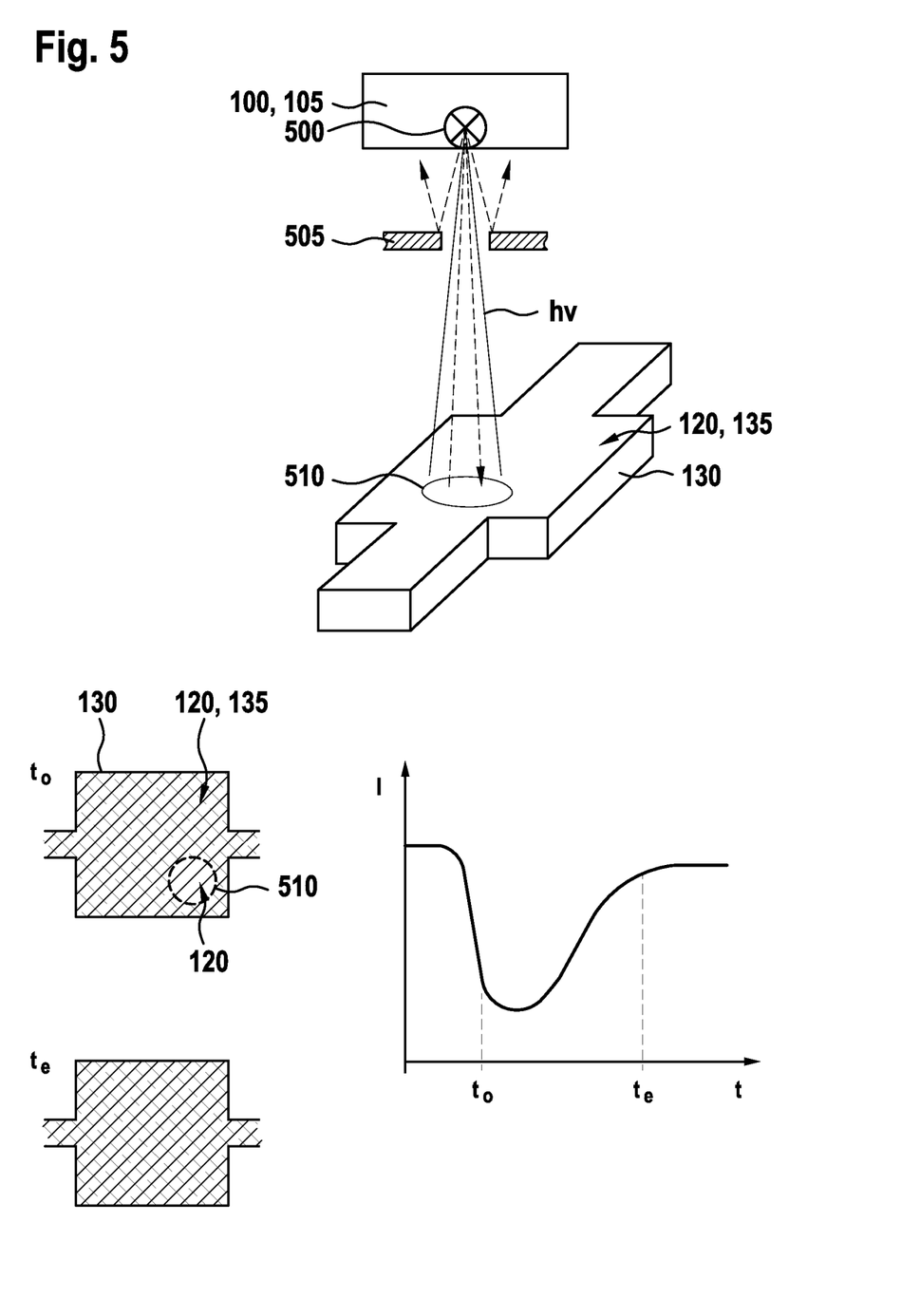
FIG. 5 shows a schematic illustration of a microfluidic analysis apparatus comprising an apparatus for measuring a temperature of a fluid according to one exemplary embodiment.

FIG. 5 shows a schematic illustration of a microfluidic analysis apparatus 100 comprising an apparatus 105 for measuring a temperature of a fluid 120 according to one exemplary embodiment. Here, this may relate to the microfluidic analysis apparatus 100 described in FIG. 1 with one of the apparatuses 105 described in any one of the preceding figures, with the difference that the microfluidic analysis apparatus 100 according to this exemplary embodiment additionally comprises an illumination device 500 and a stop 505.

According to this exemplary embodiment, the apparatus 105 is embodied to identify the diffusion characteristic of the fluid 120 using a bleaching of the auxiliary means 135 and/or the illumination device 500. The procedure described below is able to be effected by the apparatus 105 by actuating the illumination device 500 and the stop 505.

FIG. 5 shows how the temperature can be measured by diffusion without any intended fluidic mixing. Here, an excitation light hv of the illumination device 500 is focused in a first step and directed with very high intensity onto a small partial volume of the diffusion chamber 130. According to this exemplary embodiment, this focusing is achieved by a pinhole in the stop 05 in front of the light source and/or by focusing a light emitter. According to this exemplary embodiment, the light emitter is integrated in the filter set. The high intensity is achieved by raising a power of the LED and/or a general light source. As a result of this local, intensive illumination, the auxiliary means 135 in the form of a dye is locally bleached and supplies no signal. Once a sufficient amount of bleaching has taken place, the light intensity is dialed down again, the stop 505 is removed and the entire chamber is observed using the standard exposure intensity. Now, the time is measured until the spot 510 is saturated by a fluorescence signal again as a result of diffusion, Brownian motion. As a result, the temperature-dependent diffusion constant can again be measured by means of the apparatus 105 since the former is the only unknown in the system.

According to this exemplary embodiment, the FRAP, fluorescence recovery after photobleaching, principle is applied. This method is also used for determining diffusion coefficients of proteins. However, in this case, use is made of an isothermal system with known temperatures. According to this exemplary embodiment, a modified embodiment is present, wherein the target variable to be measured is the temperature that follows from ascertaining the diffusion constant. The diffusion constant including the temperature dependence is known and allows the temperature of the fluid 120 in the microfluidic chamber 130 to be deduced.

According to this exemplary embodiment, the stop 505 is manufactured from metal and/or from filter material itself such that the stop 505 only transmits light to a defined spot 510.

Figure 6:
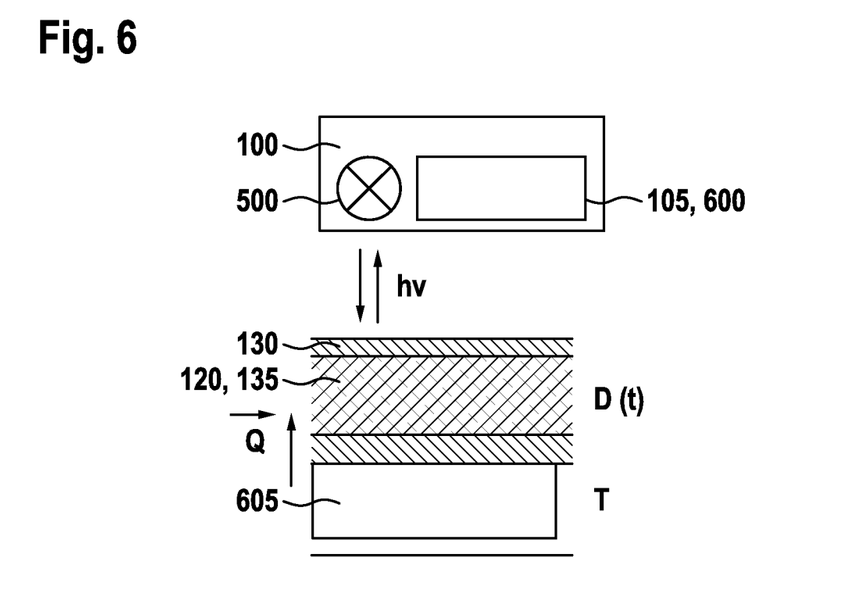
FIG. 6 shows a schematic illustration of a microfluidic analysis apparatus comprising an apparatus according to one exemplary embodiment.

FIG. 6 shows a schematic illustration of a microfluidic analysis apparatus 100 comprising an apparatus 105 according to one exemplary embodiment. Here, this may relate to the microfluidic analysis apparatus 100, described in FIG. 5, comprising the apparatus 105.

This exemplary embodiment shows a hardware embodiment in which the proposed, innovative process can be applied using the apparatus 105. A fluid container with at least one diffusion chamber 130 and the fluid 120 disposed therein and the fluorescing auxiliary means 135 is observed from above by the camera device 600. Such a fluid container can also be referred to as a microfluidic chip or cartridge. Since use is made of a fluorescence, the light source and the filter set are also situated on a camera side. A heater 605, from which heat is guided through the cartridge material to the actual fluidic chamber 130, is present on a lower side. The temperature in this chamber is of interest from a biochemical point of view. Measuring the heater temperature does not suffice since an offset arises as a result of a heat flux, i.e., a temperature offset or deviation between the heater temperature and the temperature in the chamber which would need to be characterized.

Figure 7:
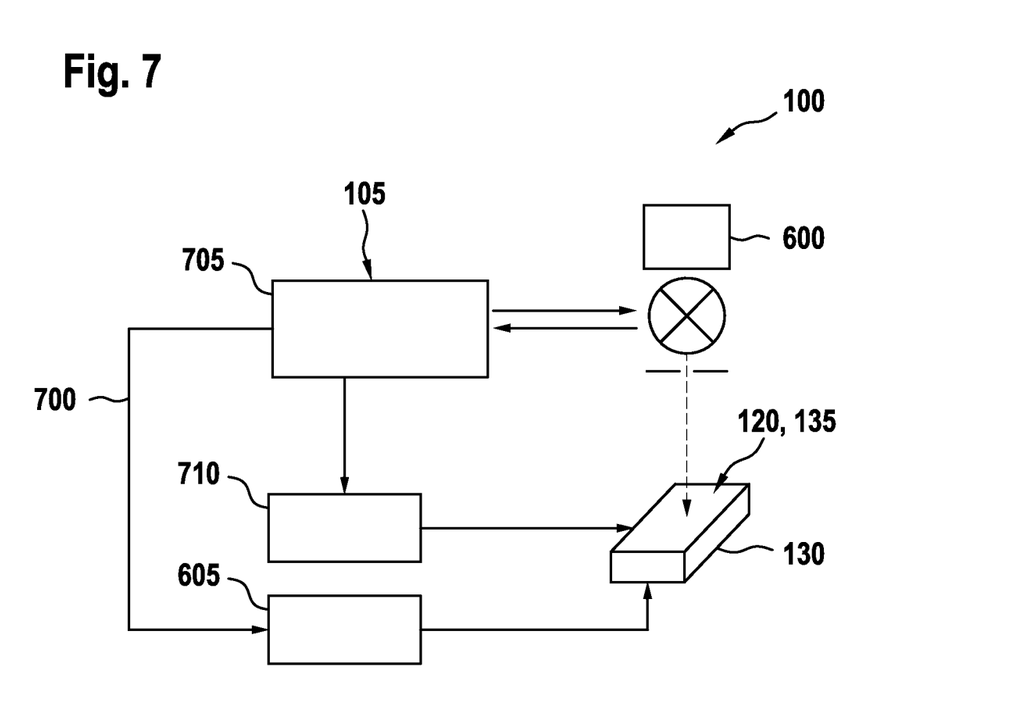
FIG. 7 shows a schematic illustration of a microfluidic analysis apparatus comprising an apparatus according to one exemplary embodiment.

FIG. 7 shows a schematic illustration of a microfluidic analysis apparatus 100 comprising an apparatus 105 according to one exemplary embodiment. Here, this may relate to the microfluidic analysis apparatus 100, described in FIG. 6, comprising the apparatus 105.

According to this exemplary embodiment, the apparatus 105 is embodied to output an adaptation signal or alteration signal 700 for setting a temperature-control device using the temperature, particularly if the temperature has a predetermined relationship with an intended temperature.

A control system of the apparatus 105 is illustrated. According to this exemplary embodiment, the apparatus 105 comprises a software control unit 705, which may also be referred to as a so-called "DiffusionCheck". According to this exemplary embodiment, the camera device 600 communicates with the "DiffusionCheck", which reads and evaluates image data of diffusion experiments. Moreover, the software control unit 705 is embodied to communicate with a pneumatic unit 710 of the microfluidic analysis apparatus 100, with the pneumatic unit 710 controlling fluidic processes such as pumping or draining of the chambers 130. Additionally, the software control unit 705 according to this exemplary embodiment is embodied to influence or alter a heater temperature of at least one heater 605 of the temperature-control device of the microfluidic analysis apparatus 100 by means of the adaptation signal or alteration signal 700. In addition to the image input, the software control unit 705 is also embodied to prompt more images to be taken by the camera device 600 and/or to induce photobleaching, as described in FIG. 5. The processes described in the preceding figures can be controlled and altered using the "DiffusionCheck" and processes can be controlled via a feedback system; this is described in more detail in FIG. 10.

Figure 8:
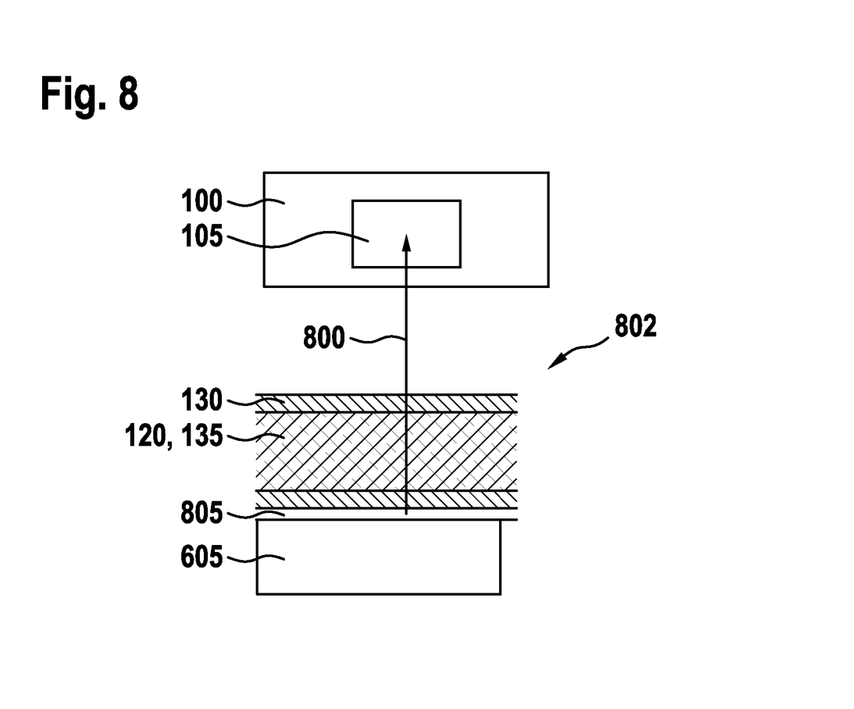
FIG. 8 shows a schematic illustration of a microfluidic analysis apparatus comprising an apparatus according to one exemplary embodiment.

FIG. 8 shows a schematic illustration of a microfluidic analysis apparatus 100 comprising an apparatus 105 according to one exemplary embodiment. Here, this may relate to the microfluidic analysis apparatus 100, described in FIG. 7, comprising the apparatus 105.

According to this exemplary embodiment, the apparatus 105 is embodied to read a test signal 800 which indicates a reception of a fluid container 802 of the fluid 120, 135 on or at the analysis apparatus 100, in particular wherein the apparatus 105 is embodied to output a warning signal if the test signal 800 indicating an incorrect reception of the fluid container 802 on or at the analysis apparatus 100 is read.

According to this exemplary embodiment, the test signal 800 indicates a possible fault profile which is detectable in combination with the diffusion measurement presented here and the feedback system. As described in FIG. 6, the fluid container 802 in the form of a microfluidic chip rests on a heater 605 according to this exemplary embodiment. If the chip rests incorrectly because dust, mechanical bending of the holding apparatus and/or other faults are present, an air gap 805 may be disposed between the heater 605 and fluid container 802, wherein the air gap 805 may lead to other offset temperatures. According to this exemplary embodiment, the apparatus 105 outputs a correction signal to the heater or to a plurality of heaters 605 in response to the test signal 800 indicating the faulty rest in order to bring about a higher heater temperature so that a possible patient sample can nevertheless be analyzed at an ideal temperature in the chamber 130, and/or the warning signal is output, the latter being embodied to report the fault and/or terminate an analysis process so that the damage to the machine can be rectified.

Advantageously, a concept as presented here does not require any additional hardware components except for in the photobleaching approach described in FIG. 5, in which the stop should be integrated into the filter apparatus of the camera device. A software routine is implemented in the apparatus 105 for running through the process, said software routine coordinating the steps to be carried out and evaluating images of the camera device.

What follows is a summary of the advantages of the approach presented here:

Thanks to the apparatus 105, there is no need to install additional sensors in a microfluidic chip or a cartridge for the purposes of the temperature measurement. A channel design and a fluorescing dye in combination with the optical structure of a microfluidic platform are sufficient to measure the temperature of the fluid 120 in the diffusion chamber 130.

Moreover, the integration of the measurement advantageously requires no adaptation or alteration of the hardware. Accordingly, no specific test cartridge should be created. It is further advantageous that the measurement can be implemented in situ, i.e., during a real experiment. If a temperature measurement is required in a fluidic process, the former can be integrated accordingly, i.e., actuated by means of the apparatus 105. Measuring the temperature by diffusion advantageously requires no calibration of the fluorescence intensity. It is also possible to measure the temperature of fluids by way of fluorescence by way of an intensity measurement; however, a calibration curve would have to be created to this end, in which known fluorescences are measured as a function of known temperatures. Since precisely these temperatures are the sought-after variables of the measurement, these processes require a second independent process for the cartridge in order to determine the temperature. By contrast, the diffusion constant measures the space-time resolution of a signal, which can be ascertained independently of the microfluidic platform. Once the diffusion constant of a substance and the temperature dependence thereof has been determined, the latter should advantageously not be determined anew, in contrast to the intensity. The latter can also be created by any suitable system or it is possible to resort to published values.

The possibility of the calibration-free in situ measurement allows a dynamic adaptation or alteration of the temperature-control device, in particular of the heaters 605. Instead of accepting predefined offsets of temperature between heater 605 and chamber 130, the apparatus 105 can be used to adapt the heater 605 and a real deviating temperature value can be corrected. This is particularly advantageous if the biochemical assay is very sensitive to temperatures. Adapting or altering the temperature is also desirable since, as a rule, patient samples are very heterogeneous. As the entire content of the sample, i.e., the fluid 120, is not always known, the thermal capacitance of the sample may change, and consequently also the previously adopted offset. In the case of temperature-sensitive assays, this may be decisive for successful detection. Additionally, this can dispense with susceptible time-intensive and high-loss purifications.

A measuring process that can be carried out according to this exemplary embodiment by means of the apparatus 105 can moreover be used as a testing means to check whether the microfluidic chip lies completely on the heaters 605 and to check that there is no cooling air gap 805 between the heater 605 and the chip.

A step sequence of the diffusion-based measurement is imaged completely automatically thanks to the apparatus 105. Consequently, a temperature characterization is advantageously largely automated.

Moreover, the apparatus 105 allows the measuring of the temperature of two chambers; a corresponding process is described in FIG. 4.

Moreover, the apparatus 105 can be used to track the heater quality in an appliance over a relatively long time. Offset measurements between heater and cartridge can be recorded by the apparatus 105. If the appliance is networked—in the context of remote maintenance, "predictive maintenance"—a tendency to deviate can be reported to the user and/or manufacturer and a repair or more detailed checks can be instigated.

Figure 9:
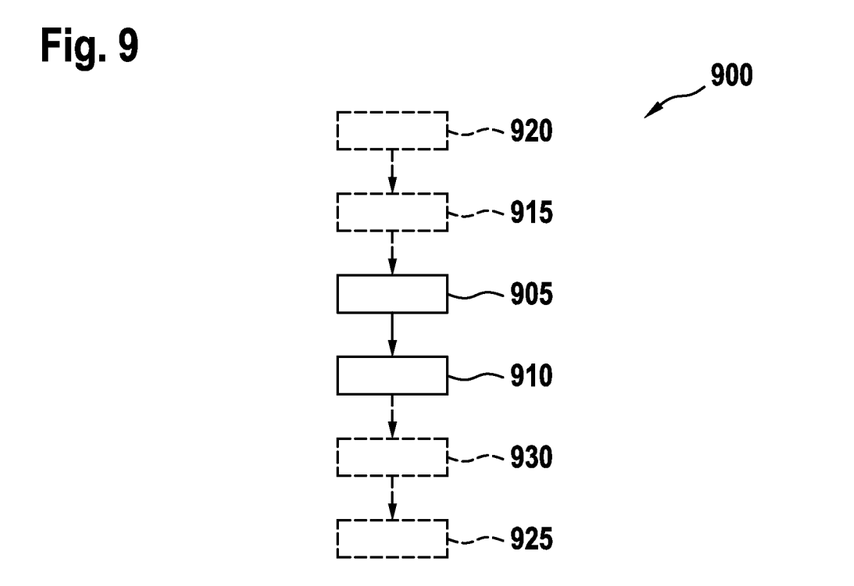
FIG. 9 shows a flowchart of a method for measuring a temperature of a fluid for use with a microfluidic analysis apparatus according to one exemplary embodiment.

FIG. 9 shows a flowchart of a method 900 for measuring a temperature of a fluid for use with a microfluidic analysis apparatus according to one exemplary embodiment.

Here, this may relate to a method 900 that can be carried out or actuated by one of the apparatuses described on the basis of any one of the preceding figures.

The method 900 comprises a reading step 905 and a determination step 910. During the reading step 905, at least one diffusion signal is read, the latter representing a diffusion characteristic of a diffusion of the fluid. During the determination step 910, the temperature is determined using the at least one diffusion signal.

Optionally, the method 900 according to this exemplary embodiment moreover comprises an identification step 915, an alteration step 920, an adaptation or alteration step 925 and a checking step 930.

According to this exemplary embodiment, the identification step 915 is carried out prior to the reading step 905. In the identification step 915, the diffusion characteristic of the fluid is identified using at least one auxiliary means, more particularly a fluorescence means, introduced into the fluid and/or using at least one camera image.

According to one exemplary embodiment, at least one further diffusion signal is read during the reading step 905, wherein the diffusion signal represents a concentration of the auxiliary means and the further diffusion signal represents a further concentration of the auxiliary means in the fluid, wherein, during the determination step 910, the temperature is determined depending on the concentration of the auxiliary means corresponding to the diffusion signal and the further diffusion signal and/or depending on a time interval between recording the diffusion signal and the further diffusion signal.

According to an alternative exemplary embodiment, a linear concentration gradient between a first chamber with a first concentration of the auxiliary means and/or a first temperature of the fluid and a second chamber with a second concentration of the auxiliary means and/or a second temperature of the fluid is read as the diffusion signal during the reading step 905.

A concentration of the auxiliary means is altered in the alteration step 920 prior to the reading step 905 and/or the identification step 915. According to this exemplary embodiment, a pneumatic signal is output to a pneumatic unit of the microfluidic analysis apparatus in the alteration step 920.

According to one exemplary embodiment, the diffusion characteristic of the fluid is identified using a bleaching of the auxiliary means and/or an illumination device during the identification step 915.

An adaptation signal or alteration signal for setting a temperature-control device is output in the adaptation or alteration step 925 using the temperature, more particularly if the temperature has a predetermined relationship with an intended temperature.

A test signal is read in the checking step 930, said test signal indicating that a fluid container of the fluid is received on or at the analysis apparatus, more particularly wherein a warning signal is output if the test signal indicating an incorrect reception of the fluid container on or at the analysis apparatus is read.

The method steps presented here may be repeated and may be carried out in a different sequence to the one described.

The method 900 is detectable by inspecting the fluidic process and/or the employed chemicals. A process presented here can also be detected by simultaneous measurement of the heater and camera activity.

Figure 10:
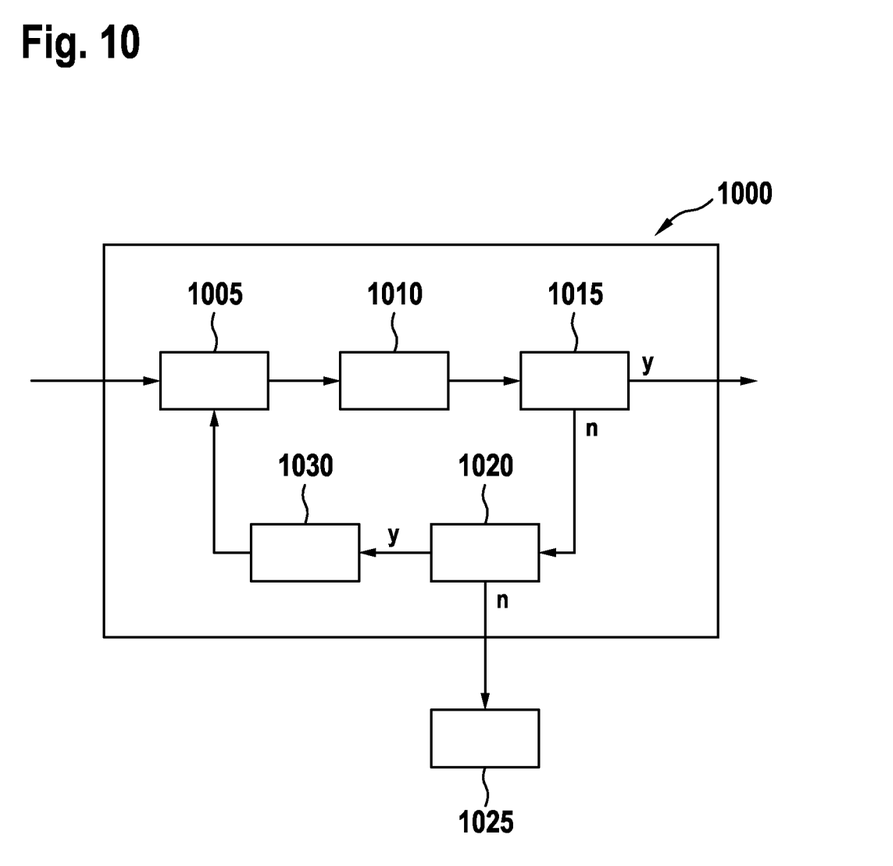
FIG. 10 shows a flowchart of a method for measuring a temperature of a fluid for use with a microfluidic analysis apparatus according to one exemplary embodiment.

FIG. 10 shows a block diagram 1000 of a method for measuring a temperature of a fluid for use with a microfluidic analysis apparatus according to one exemplary embodiment. Here, this may be the method described in FIG. 9.

A possible process pattern using the apparatus, more particularly the "DiffusionCheck" described in FIG. 7, is shown. If this is called in a fluidic process, the heaters of the chamber to be measured are set to a default value for the ACTUAL value, which, based on an empirical identification, reports the desired chamber temperature, illustrated here in a first block 1005 where a heater temperature is set to an offset temperature.

A subsequent second block 1010 denotes a measurement of the diffusion constant according to the proposed principle and an ascertainment of the chamber temperature. The second block 1010 may correspond to steps 905 and 910 described in FIG. 9.

A subsequent third block 1015 denotes a comparison of the desired temperature, i.e. the intended temperature, with the measured temperature, i.e., the ACTUAL temperature.

If the temperature lies in the desired range, "DiffusionCheck" is terminated and the fluidic process of the overall assay is continued. If the comparison is negative, a check is carried out in a fourth block 1020 as to whether the new offset lies in a range for which experiments have ascertained in advance that a smaller offset can be attained by adjusting the heater INTENDED temperatures. If the offset is too large, i.e., if the offset exceeds a predetermined tolerance range, because a fault is present, for example an air gap, then the test is terminated in a fifth block 1025 and a corresponding fault is reported to the user. If the offset lies in the tolerance range, the "DiffusionCheck" starts anew, wherein the heater value, i.e., a heater INTENDED temperature, is altered in a sixth block 1030; as a rule, the temperature is slightly increased. If the increase is found to be excessive, it is lowered. This loop is repeated until the target is iteratively reached or until it is terminated after a defined number of loops because the target or intended temperature is not reached and an endless loop should be avoided.

Serial calling of "DiffusionCheck" with different INTENDED temperatures allows an automatic calibration and characterization of the chamber temperature. This can be exploited to monitor the heater behavior over a relatively long period and/or to be used in a setup with "predictive maintenance".

The invention claimed is:

1. A method for measuring a temperature of a fluid for use with a microfluidic analysis apparatus, comprising:
   introducing at least one auxiliary detectable solution into the fluid;
   recording at least one diffusion signal representative of a first concentration of the at least one auxiliary detectable solution in a first portion of the fluid located in a first chamber of the microfluidic analysis apparatus;
   recording at least one further diffusion signal representative of a second concentration of the at least one auxiliary detectable solution in a second portion of the fluid located in a second chamber of the microfluidic analysis apparatus; and
   determining the temperature of the fluid by using a time interval between the recording of the at least one diffusion signal and the recording of the at least one further diffusion signal.

2. A method for measuring a temperature of a fluid for use with a microfluidic analysis apparatus, comprising:
   introducing at least one auxiliary detectable solution into the fluid;
   reading at least one diffusion signal representative of a first concentration of the at least one auxiliary detectable solution in a first portion of the fluid located in a first chamber of the microfluidic analysis apparatus;
   reading at least one further diffusion signal representative of a second concentration of the at least one auxiliary detectable solution in a second portion of the fluid located in a second chamber of the microfluidic analysis apparatus;
   determining a linear concentration gradient between the first concentration and the second concentration; and
   determining the temperature of the fluid based on the determined linear concentration gradient.

3. The method according to claim 1, further comprising:
   altering a concentration of the at least one auxiliary detectable solution prior to the recording the at least one diffusion signal.

4. The method according to claim 1, further comprising:
   bleaching the at least one auxiliary detectable solution introduced in the fluid.

5. The method according to claim 1, further comprising:
   outputting an alteration signal to set a temperature-control device based on the determined temperature.

6. The method according to claim 1, further comprising:
   reading a test signal, the test signal indicating that a fluid container of the fluid is received on or at the microfluidic analysis apparatus; and
   outputting a warning signal if the test signal indicates an incorrect reception of the fluid container on or at the microfluidic analysis apparatus.

7. The method according to claim 1, wherein an apparatus is configured to carry out and/or actuate the method, in appropriate units.

8. The method according to claim 1, wherein a computer program is configured to execute and/or actuate the method.

9. The method according to claim 8, wherein the computer program is stored on a non-transitory machine-readable storage medium.

10. A method for measuring a temperature of a fluid for use with a microfluidic analysis apparatus, comprising:
    filling a diffusion chamber with a mixture including a fluid and an auxiliary detectable solution through a first input of the diffusion chamber, the mixture having a predefined concentration of the auxiliary detectable solution mixed with the fluid;
    replacing, after the filling, a partial volume of the diffusion chamber by supplying an additional quantity of the fluid to the first input and by draining the mixture from a second input of the diffusion chamber;
    reading, after the replacing, a first diffusion signal representative of a first concentration of the at least one auxiliary detectable at a first region of interest of the diffusion chamber, the first region of interest located closer to the first input than to the second input;
    reading, after the replacing, at least one further diffusion signal representative of a second concentration of the at least one auxiliary detectable solution at a second region of interest of the diffusion chamber, the second region of interest located closer to the second input than to the first input and spaced apart from the first region of interest; and
    determining the temperature of the fluid based on the first diffusion signal and the second diffusion signal.

11. The method according to claim 10, wherein the additional quantity of the fluid is half of a total volume of the diffusion chamber.

12. The method according to claim 10, wherein replacing the partial volume of the diffusion chamber with the fluid comprises:

introducing the additional quantity of the fluid supplied to the first input to the diffusion chamber with a laminar flow using a peristaltic pump.

\* \* \* \* \*